April 6, 1937.  T. S. VIEROW  2,076,284
EXTRUDING MACHINE
Filed Oct. 22, 1934   2 Sheets-Sheet 1
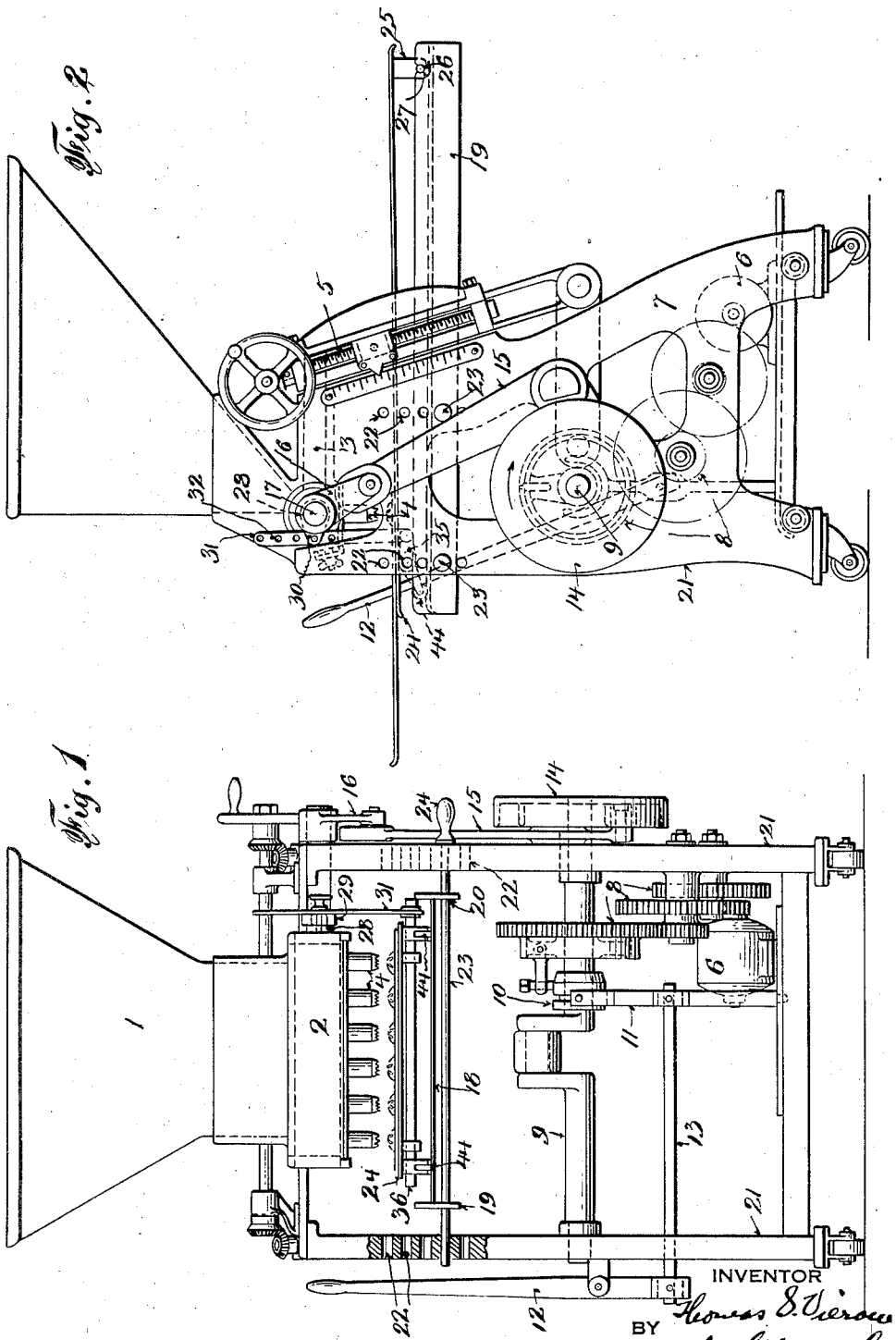
INVENTOR
Thomas S. Vierow
BY Charles G. Hensley
ATTORNEY April 6, 1937.　　　T. S. VIEROW　　　2,076,284
EXTRUDING MACHINE
Filed Oct. 22, 1934　　　2 Sheets-Sheet 2
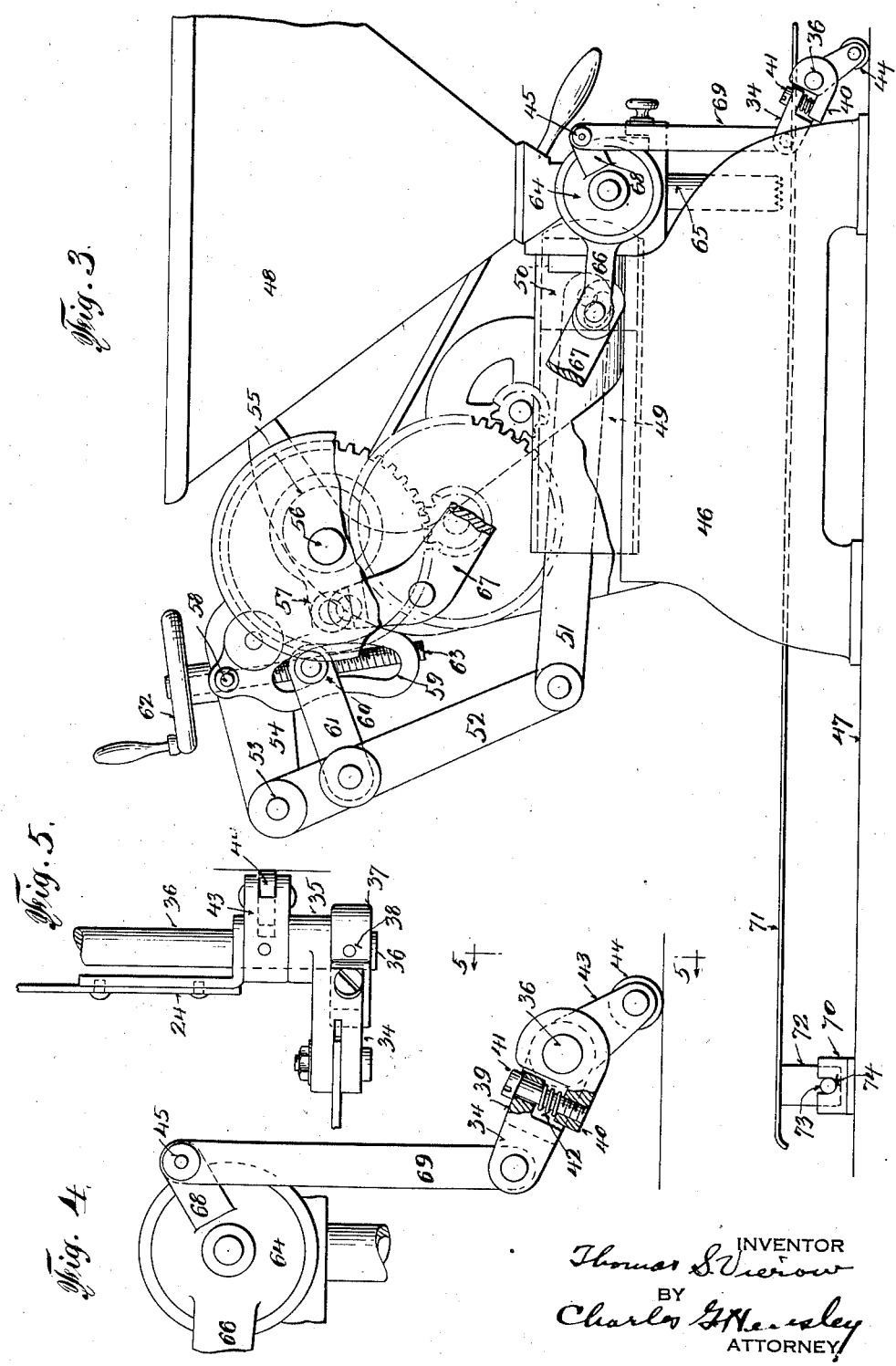

Patented Apr. 6, 1937

2,076,284

UNITED STATES PATENT OFFICE 2,076,284

EXTRUDING MACHINE

Thomas S. Vierow, Jersey City, N. J.

Application October 22, 1934, Serial No. 749,381

6 Claims. (Cl. 107—28)

The object of my invention is to provide an extruding machine for extruding shaped articles such as confections, candies and other food products in which one or more pistons extrude the material through a die and nozzles upon a table. The present invention relates to a machine of this character having a rocking or vibrating table to receive the extruded articles. Vibrating tables have been used in extruding machines wherein an actuating mechanism causes the table to move a slight distance away from the nozzle in order to break the material or disengage it from the nozzles. In machines as heretofore constructed complicated mechanism has been used to vibrate the table, whereas in the present case I employ a very simple device for this purpose and one which may be readily applied to machines now in use.

The main object of my invention is to provide a device operated from the valve of the extruding machine to cause the vibration or oscillation of the table. This device is such that it may be readily applied to any extruding machine without altering its construction.

In one form of the invention I have shown a stationary table which may be adjusted to lie in different horizontal planes to suit different types or sizes of articles discharged by the extruding nozzles and I have shown also the vibrating table conjointly applied to the same machine.

In another form of the invention I have shown the table vibrating device applied to a bench type of extruding machine such as shown in my U. S. Patent No. 1,826,230, dated October 6, 1931, which permits the bench type of machine to be supplied with a vibrating table in a very simple manner. In this construction, also, the device for vibrating the table is operated from the valve.

Other objects and advantages of the invention will be set forth in the following detailed description of my invention.

In the drawings forming part of this application,

Figure 1 is an end view of an extruding machine embodying my invention and including both the vibrating table and the adjustable, stationary table, Figure 2 is a side elevation of the same machine, Figure 3 is a side elevation of a bench type of machine like that shown in my aforesaid patent and having my present invention embodied therein, Figure 4 is an enlarged detail view of the device for vibrating the table, and Figure 5 is a sectional view taken on the line 5—5 of Figure 4.

I will first describe the form of the invention shown in Figures 1 and 2. This is the type of extruding machine which is adapted to stand upon a floor as distinguished from the bench type of machine. My present invention requires no modification of the extruding machine itself other than the table operating devices. The machine illustrated has a hopper 1 in which the material in plastic condition is fed to a valve casing 2 and from the valve casing the material is drawn into cylinders 3 by means of plungers (not shown) and after the valve is moved to shut off the flow from the hopper a reverse movement of the plungers forces the material out of the valve casing and down through the discharge nozzles 4 to deposit upon the stationary or vibrating table as the case may be.

As is well known, the bottom ends of the nozzles may be given different shapes so that the tops of the deposited pieces will have various flutings and other surface markings. At 5 is shown part of the device for adjusting the thrust of the piston to regulate the amount of material discharged at each operation of the plungers and as this device is well known in the art a detailed description of the same is not necessary to the understanding of my present invention. The motor 6 mounted on the lower portion of the frame 7 of the machine operates through a chain of gears 8 to drive the main shaft 9 from which the different operating parts of the machine are operated. There is a clutch 10 on this shaft operated by the lever 11 to throw the shaft into and out of operation and this clutch is operated by means of a hand lever 12 fulcrumed on one of the side frames of the machine and acting through a pitman 13 upon the lever 11. On one end of the shaft 9 projecting beyond the frame of the machine I have shown the usual cam 14 which operates the lever 15 and one arm of this lever is pivotally connected to the lever arm 16 which is fixed to the end of the valve 17 which projects beyond the valve casing 2 and which also projects through the adjacent side frame of the machine where the hub of the lever arm 16 is fixed to it. The parts thus far described are the well known parts of this type of extruding machine.

The stationary table which I have illustrated in Figures 1 and 2 consists of the table portion 18 having at each side thereof a vertically disposed plate 19 which plates extend above and below the plane of the stationary table member 18.

The portion extending above the plane of the table proper forms lateral abutments to prevent objects from moving sidewise off the table.

The portions of these side plates extending below the plane of the table proper are provided, preferably, with two apertures 20 disposed at different points along the length of each of the members 19 with the apertures in the plates at opposite sides of the table aligning with each other. There may be a greater number of these apertures disposed lengthwise of the plates, as desired, although two will suffice for the purposes indicated.

The end frames 21 of the machine are provided with apertures 22 spaced apart lengthwise of the machine to correspond with the spacing of the apertures 20 but instead of one set of such apertures, I have shown four pairs thereof, each pair arranged in a different horizontal plane, corresponding to the different adjusted positions of the stationary table. There are two rods 23 each provided with a handle 24 for manipulating them, and these rods are adapted to be inserted into any of the various apertures 22 in the side frames of the machine, and also to be passed through the apertures 20 of the side plates 19 of the table, in order to support the stationary table at different horizontal positions and at different distances below the extruding nozzles 4 according to the sizes of the pieces which are discharged from these nozzles.

When relatively large pieces are to be discharged, the stationary table will be adjusted to a lower position or farthest from the extruding nozzles, whereas when smaller pieces are to be extruded the table may be raised to a position closer to the extruding nozzles. The table may be placed in any of the several horizontal positions by withdrawing the rods 23 and inserting them into different apertures in the side frames and in the side plates of the table. It will be obvious that any greater or lesser number of adjusting apertures may be employed, as desired.

The vibrating table shown in Figures 1 and 2 may be used in cases where a vibrating table is desirable, and while the vibrating table may be used in conjunction wtih a non-adjustable stationary table, I have shown in these views how a vibrating table may be used in conjunction with an adjustable stationary table. For this purpose I have shown the vibrating table 24 disposed above the stationary table 18 and it is provided at one end with downwardly extending brackets 25 which have a rod 26 pivotally set in recesses 27 on the side plates 19 of the stationary table, so that the vibrating table may rock from this rod as its pivot. The vibrating table extends below the hopper and under the extruding nozzles 4 and it extends forwardly some distance to the left, as shown in Figure 2.

The device for supporting this forward portion of the table and for causing it to vibrate, comprises the following: There is a sleeve 28 pinned to the valve 17 which latter controls the extruding of the material through the nozzles as described above; and there projects from this sleeve a lever arm 29 of rather short length, which is provided on its end with a fork 30 with which the pitman 31 is pivotally connected by a bolt extending through the fork and through one of the apertures 32 of the pitman. There are several of these apertures arranged at different positions along the pitman, so that the connection between the pitman and the lever arm 29 may be adjusted to correspond with the various adjusted positions of the stationary table; and for that purpose it is preferable to have as many apertures 32 as there are sets of apertures 22 in the frame of the machine and corresponding in the vertical spacing with the vertical spacing of the several pairs of apertures 22.

This pitman 31 extends downwardly from the lever arm 29 beyond one side of the vibrating table and at 33 it is pivotally connected with a short lever arm 34 which is preferably connected with the lateral shaft 36 in the manner shown in Figure 4. The arm 34 has a hub 35 pivoted loosely on the shaft 36. There is another hub 37 which is pinned by means of the pin 38 to the shaft 36. The lever arm 34 has a shoulder 39 extending to the right in Figure 4, whereas the hub 37 carries an extension 40 extending to the left in Figure 4, so that these two extensions overlie each other and they are connected by a bolt 41 passing through an aperture in the extension 39 and threaded into the extension 40 whereby these are connected to each other. A coiled spring 42 surrounds the bolt 41 and normally urges the two extensions 39, 40 away from each other. On the shaft 36 there are shown two arms 43 which are duplicates of each other and these extend downwardly and at their lower ends they carry rollers 44 which are adapted to rest upon the top surface of the stationary table.

In the construction illustrated these rollers rest upon the adjustable stationary table but it is understood that if the stationary table is non-adjustable the rollers will rest upon it in the same manner as shown herein.

Operation

It will be apparent that the rear end of the vibrating table is pivotally supported upon the bar 26 and the forward end of the table is supported on the shaft 36. Each time the valve 17 is oscillated through the lever 15 and the arm 16 which is at each stroke of the machine, or at each complete reciprocation of the extruding plungers, the pitman 31 will be moved upwardly and downwardly through the rocking motion of the lever arm 29 which is connected with the valve.

Each time the pitman rises it causes the shaft 36 to rise because the lever composed of the two arms 34, 38 and the arms 43 fulcrum on the rollers 44 which rest on the stationary table, so that the forward end of the table is raised slightly to a position closer to the ends of the extruding nozzles at the moment or just before the material is extruded from the nozzles. When the pitman is moved downwardly by the reverse rocking of the lever arm 29 the shaft 36 is thereby caused to move downwardly a slight extent and since the forward end of the vibrating table rests upon this shaft, it likewise moves downwardly a slight extent or away from the ends of the extruding nozzles. It is while this rapid downward movement of the vibrating table is taking place that the material under each nozzle is caused to break away from the nozzles, so that each extruded piece will have no string of material or connection of any kind at the nozzle at the time the extruding operation is completed.

The operation above described is repeated at each cycle of the machine, so that the table is automatically vibrated in definite timed relation with the extruding of the pieces. The vibrating of the table is effected from the oscillating valve so that there is perfect timing of the vibration of the table in relation to the extruding operations. Furthermore, the mechanism for vibrating the table is very simple and it can be applied to any of the machines now in use. As the vibrating device rests through the rollers 44 upon a stationary table, it is a very simple matter to apply the device to any existing machine.

If it is desired to remove the vibrating table for certain kinds of work whereby the pieces will be extruded upon the stationary table, it is only necessary to unhook the vibrating table by unhooking the rod 26 from the sockets 27 whereupon the vibrating table may be slid longitudinally from the machine, leaving the stationary table in place to receive the extruded pieces.

To raise or lower the stationary table it is only necessary to remove the rods 23, raise or lower the stationary table, and reinsert the rods 23 in different apertures 22, according to the new position of the stationary table. When the stationary table is adjusted to a new position, the bolt 45 will be removed from the lever arm 29 and from the link 31 and after the stationary table has been adjusted to its new position the bolt 45 will be returned to the arm 29 and will thus be inserted through a different aperture 32 in the pitman 31, according to its new position, to correspond with the new position of the stationary table. By thus adjusting the pitman the table vibrating device is adjusted to correspond with the new position of the stationary table.

In Figure 3 I have shown the invention applied to a bench type of extruding machine like the one shown in my U. S. Patent No. 1,826,230, dated Oct. 6, 1931. In this type of machine there is a small and low frame 46 which is adapted to rest on a bench 47 or any other support, so that the machine is of a portable type and may be carried to any place in the shop where extruding is to be done. The hopper 48 corresponds with the hopper 8 in my said patent. The material is withdrawn from the hopper into piston casings 49 by means of pistons 50 sliding in the piston casing and operated by a pitman 51 pivotally connected thereto. This pitman is pivotally connected with an operating lever 52 which is pivoted at 53 to a bracket 54. There is an eccentric 55 operated from the shaft 56 and it rocks the lever 57 which is fulcrumed on the pin 58; and this lever has an arcuate slot 59 in which an adjustable bearing block 60 engages, the bearing block being pivotally connected with the lever 52 whereby the motion of the eccentric is transmitted through the lever 57 and the arm 61 to the lever 52 to operate the pistons.

The wheel and handle 62 operate a threaded shaft 63 which adjusts the bearing block in relation to the arcuate slot 59 for the purpose of adjusting the thrust or throw of the piston. All of these parts are shown and described in my aforesaid patent to which further reference may be had for details of the remainder of the machine.

The valve which controls the passage of the material from the hopper into the cylinder or cylinders and from there into the discharge nozzles 65, is shown at 64 in the present drawings, and it corresponds with the similar member 9 of the aforesaid patent. The lever arm 66 attached to this valve corresponds with the lever arm 43 of said patent and the lever arm 67 corresponds with the lever arm 46 of the said patent. Through the action of a cam on the shaft 56 acting on a roller on one end of the lever 67 rocking motion is transmitted to the valve to oscillate the same in timed relation with the reciprocation of the pistons.

In this form of the invention I have shown a lever arm 68 formed on the end of the valve 64 and to this is pivotally connected the downwardly extending pitman 69 which corresponds in function with the pitman 31 shown in Figure 2. The pitman 69 however, is not provided with adjusting holes as this type of machine is not provided with an adjustable stationary table. The lower end of the pitman 69 is connected with the arm 34 shown in Figure 4 and from there down to the rollers 44 the construction of the device for operating the locking table is the same as described in connection with Figures 1 and 2.

In this type of machine the rollers 44 engage on the surface of the bench 47 or whatever other body the portable machine rests upon. There is a bracket 70 adapted to be bolted or to merely rest upon the top of the bench 47 there being two such brackets spaced apart about the width of the vibrating table.

The vibrating table 71 is shown with depending brackets 72 carrying a shaft 73 the ends of which seat in the sockets 74 in the brackets 70, so that the vibrating table is pivoted at one end similar to the table in the first described form of the invention. The vibrating table extends forwardly or towards the right in Figure 3 and its forward end rests upon the shaft 36 of the vibrating table.

*Operation*

The present form of the invention operates substantially the same as in the first form. As the valve 64 is oscillated to control the extruding of the pieces through the extruding nozzles 65 the lever arm 68 acts through the pitman 69 to lift the right hand end of the vibrating table in Figure 3 at the moment of extrusion and then the pitman is moved downwardly to lower the table and break off the material at the completion of the extruding operation. The pitman 69 acts on the lever arm 34 in the same manner as in the first form of the invention. In both forms the vibration of the table is effected from the valve.

The purpose of the bolt 41 and the spring 42 connecting the projecting members 39, 40 is to allow of a rather fine adjustment between the two lever arms 34, 43 in order that the uppermost position of the vibrating table may be nicely regulated in relation to the lower end of the extruding tubes. By adjusting this bolt the upper position of the vibrating table may be raised or lowered a slight extent by adjusting the relation of the two members 39, 40 thereby regulating the angular position of the levers 43 to support the vibrating table.

While I do not claim to be the first to provide a vibrating table even for extruding machines, I believe I am the first to operate the vibrating table from the valve and I have provided the simplest form of vibrating device.

I also believe this is the first case in which a table vibrating device has been applied to a portable extruding machine. While I have shown and described in detail two forms of my invention, it will be understood that various changes and modifications may be made without departing from the scope of the following claims.

Having described my invention, what I claim is:

1. The combination of an extruding machine having a cylinder and a reciprocating piston for drawing material into and forcing it out of said cylinder, and having an oscillating valve controlling the discharge of the pieces through an extruding nozzle, of a rocking table on which the extruded pieces are adapted to be deposited, and means operated from said valve and acting on said table to raise and lower the same in timed relation with the discharge of pieces from said nozzle, including a pair of lever arms adapted to rest on a support below said table, said lever arms having means to support one end of said table, another lever arm associated with said first lever arms and a link connected with said third arm and with a member on said valve whereby the movements of the valve are transmitted to the lever arms which support one end of the table.

2. The combination of an extruding machine having a cylinder and a reciprocating piston for drawing material into and forcing it out of said cylinder, and having a valve controlling the discharge of the pieces through an extruding nozzle, of a rocking table on which the extruded pieces are adapted to be deposited, a plurality of lever arms adapted to detachably rest and to move along upon a support below said table and adapted to support one end of said table, and means operated in synchronism with said extruding machine for rocking said lever arms to raise and lower one end of said table in relation to the extruding operation.

3. The combination of an extruding machine having a cylinder and a reciprocating piston for drawing material into and forcing it out of said cylinder, and having an oscillating valve controlling the discharge of the pieces through an extruding nozzle, of a rocking table on which the extruded pieces are adapted to be deposited, and means operated from said valve and acting on said table to raise and lower the same in timed relation with the discharge of pieces from said nozzle, a pair of lever arms having means to support one end of said rocking table, said lever arms adapted to rest on a support, a lever arm for rocking said pair of lever arms and composed of separable parts, a spring and bolt for adjusting the parts of said third mentioned lever arm to adjust the position of the table in relation to the extruding nozzle and means for rocking said third mentioned lever arm in synchronism with the operations of said extruding machine.

4. The combination of an extruding machine having a cylinder and a reciprocating piston for drawing material into and forcing it out of said cylinder, and having a valve controlling the discharge of the pieces through an extruding nozzle, a stationary table disposed below the extruding nozzle, and adjustable means for supporting said table in different horizontal planes in relation to the extruding nozzle, a vibrating table detachably supported on said first table, and means for vibrating said detachable table toward and from the discharge end of said nozzle.

5. The combination of an extruding machine having a cylinder, a reciprocating piston for drawing material into and forcing it out of said cylinder, and having an oscillating valve controlling the discharge of pieces through an extruding nozzle, a stationary table disposed below said nozzle, means for supporting said table in different horizontal planes in relation to said nozzle, a detachable table pivotally mounted above said first table, a pair of lever arms adapted to rest on said first table, and having means to support one end of the detachable table, and means operated in synchronism with the extruding machine to rock said levers for the purpose of vibrating said second mentioned table in relation to the discharge end of said nozzle.

6. The combination of an extruding machine having a cylinder, a reciprocating piston for drawing material into and forcing it out of said cylinder, and having an oscillating valve controlling the discharge of pieces through an extruding nozzle, means for supporting said table in different horizontal planes in relation to said nozzle, a detachable table pivotally mounted above said first table, a pair of lever arms adapted to rest on said first table, a third lever arm connected with said pair of lever arms, a link pivotally connected with said third lever arm, an arm associated with said valve and adjustable means for connecting said last mentioned arm at different points on said link to accord with the vertical adjustment of said tables.

THOMAS S. VIEROW.